United States Patent
Ratakonda et al.

(10) Patent No.: US 10,601,639 B2
(45) Date of Patent: Mar. 24, 2020

(54) MULTI CAUSE CORRELATION IN WIRELESS PROTOCOLS

(71) Applicant: Tektronix Texas, LLC, Westford, MA (US)

(72) Inventors: Balaji Ratakonda, Dallas, TX (US); John P. Curtin, Richardson, TX (US); Vignesh Janakiraman, Plano, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 354 days.

(21) Appl. No.: 15/001,931

(22) Filed: Jan. 20, 2016

(65) Prior Publication Data

US 2017/0207948 A1    Jul. 20, 2017

(51) Int. Cl.
*H04L 12/24*    (2006.01)
*H04L 12/26*    (2006.01)

(52) U.S. Cl.
CPC ........ *H04L 41/064* (2013.01); *H04L 41/0631* (2013.01); *H04L 43/0823* (2013.01); *H04L 43/18* (2013.01); *H04L 43/045* (2013.01)

(58) Field of Classification Search
None
See application file for complete search history.

(56) References Cited

U.S. PATENT DOCUMENTS

| | | | |
|---|---|---|---|
| 8,230,051 B1 | 7/2012 | Zahavi et al. | |
| 8,958,438 B2 * | 2/2015 | Figura | H04L 43/08 370/465 |
| 2004/0205360 A1 * | 10/2004 | Norton | H04L 63/0227 726/23 |
| 2009/0019310 A1 * | 1/2009 | Nastacio | G06F 11/0709 714/26 |
| 2009/0313198 A1 | 12/2009 | Kudo et al. | |
| 2010/0268797 A1 | 10/2010 | Pyrik et al. | |
| 2013/0067109 A1 | 3/2013 | Dong et al. | |
| 2013/0212257 A1 | 8/2013 | Murase et al. | |
| 2014/0068348 A1 * | 3/2014 | Mondal | H04L 41/16 714/45 |
| 2015/0003466 A1 * | 1/2015 | Soffer | H04L 47/125 370/412 |
| 2016/0330111 A1 * | 11/2016 | Manghirmalani | H04L 43/028 |

FOREIGN PATENT DOCUMENTS

EP    2149224 A2    2/2010

OTHER PUBLICATIONS

Extended European Search Report for European Patent Application No. 17152467.1, dated Apr. 17, 2017.
European Examination Report for European Patent Application No. 17152467.1, dated Apr. 19, 2018.

* cited by examiner

*Primary Examiner* — Brian Whipple
(74) *Attorney, Agent, or Firm* — Locke Lord LLP; Scott D. Wofsy; Christopher J. Capelli

(57) ABSTRACT

A network monitoring system is provided that includes a processor, a memory coupled to the processor and a database that includes session data of one or more transactions in a multiprotocol wireless communication system. The network monitoring system further includes a rule engine configured and operable to store rules associated with at least one rule set. The network monitoring system also includes an analysis engine configured to identify a root cause of a failure for one or more of the transactions based on at least one rule in the rule set.

10 Claims, 4 Drawing Sheets

MULTI CAUSE CORRELATION IN WIRELESS PROTOCOLS

FIELD OF THE INVENTION

The present invention relates, in general, to network monitoring, and more particularly to multi cause correlation in wireless networks.

BACKGROUND OF THE INVENTION

Network and customer experience monitoring solutions are widely accepted standards for the operations of carrier service provider networks across both fixed networks (e.g., Cable/Multi System Operator (MSO), IP broadband such as Digital Subscriber Line (DSL), Fiber To Home (FITH), etc.) and mobile networks (e.g., second and a half generation (2.5G), third generation (3G), fourth generation (4G), 3GPP Long Term Evolution (LTE), etc.). These systems monitor network traffic via probe devices, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business process.

Contemporary telecommunication network environments typically involve multiple technologies, multiple protocols, and interconnections to a wide variety of networks. More complex network environment means that the potential for problems in internetworks is high, and the source of problems is often elusive. Thus, there is a strong demand for robust diagnostic tools for troubleshooting networking failures.

Currently, there are performance monitoring tools which correlate multiple protocols by correlating Protocol Data Units (PDUs) across several different interfaces and protocols into a single session record that can be viewed in an analyzer tool. While such tools are useful in identifying certain network issues, at any given moment, there may be several hundreds or even thousands of PDUs that need to be analyzed over a short period of time. Thus, existing monitoring tools are limited in their diagnostic capabilities since in order to identify a root cause of any failure it is necessary to manually sift through all the transactions, PDUs and causes. This is very time consuming.

It is to be appreciated that when a network problem arises, it can be rooted anywhere in the networks. To troubleshoot network issues quickly, it is imperative to have automated analysis scheme capable of identifying a root cause for each network issue.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a network monitoring system is provided that includes a processor, a memory coupled to the processor and a database that includes session data of one or more transactions in a multiprotocol wireless communication system. The network monitoring system further includes a rule engine configured and operable to store in the memory rules associated with at least one rule set. The network monitoring system also includes an analysis engine configured and operable to identify, using the processor, a root cause of a failure for one or more of the transactions based on the at least one rule in the rule set.

In another aspect, a method for automatically identifying a source of failure in a wireless communication system is provided. Rules associated with session data of a plurality of transactions in the wireless communication system are generated. One or more failures in the wireless communication system are identified. One or more transactions from the plurality of transactions associated with the identified failures are identified. One or more network elements of the wireless communication system substantially responsible for the identified failures are identified by correlating the transactions based on the generated rules.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
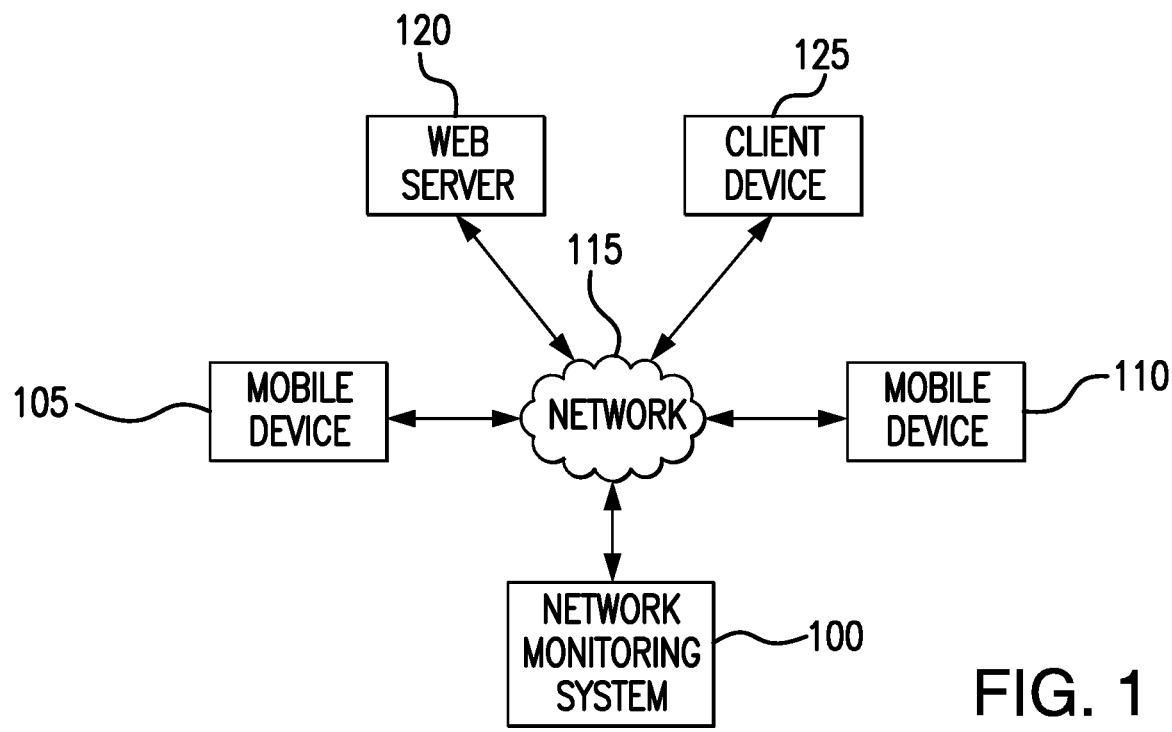
FIG. 1 is a block diagram of a network monitoring system according to some embodiments of the present invention.

The below illustrated embodiments are directed to a system and method for multi cause correlation in wireless protocols in which a component or a feature that is common to more than one illustration is indicated with a common reference. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably utilized in conjunction with a software algorithm, program or code residing on computer useable medium having control logic for enabling execution on a device having a computer processor. The device typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the certain embodiments described herein. Thus, the certain embodiments are not to be understood to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

FIG. 1 illustrates a block diagram of a network monitoring system. As illustrated, mobile devices 105 and 110 may be capable of transmitting and receiving data (e.g., web pages, audio, video, etc.) to and from each other over network 115. Also, web server 120 may be configured to provide one or more web pages to client device 125 through network 115. In various embodiments, network 115 may include any suitable wireless/mobile computer or data network including, for example, a 3G, 4G, or LTE wireless networks, etc.

Communications between mobile devices 105 and 110, as well as communications between web server 120 and client device 125, may be monitored by network monitoring system 100, as data packets comprising those communications pass through wireless network 115 spanning multiple interfaces.

As such, network monitoring system 100 may include a network monitor or analyzer, a packet sniffer, a probe, or the like, coupled to network 115. Protocols used to enable communications taking place in FIG. 1 may be selected, for instance, based upon the type of content being communicated, the type of wireless network 115, and/or the capabilities of devices 105, 110, and/or 125. Examples of types of protocols that may be used include, but are not limited to, HTTP, Real Time Messaging Protocol (RTMP), and RTP.

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track the same set of user experience information for each service, each session and each client without regard to the protocol used to support the session. Various embodiments of the present invention further contemplate that network monitoring system 100 can optionally further provide other services, such as, but not limited to, an analysis scheme whereby all relevant information related to a subscriber activity spanning multiple interfaces is examined to provide precise root cause failure identification of the session. Generally speaking, such analysis scheme may utilize a rules engine to create a standard set of cause analysis rules which will be used by an analyzer module coupled to the rules engine to determine the source of the failure and can be further tuned to meet individual customer needs.

According to some embodiments, network monitoring system 100 may be configured to automatically sift through and correlate relevant transactions and corresponding failure causes to automatically discover the actual network element and transaction that caused the identified failure. A myriad of transactions can spawn multiple error messages into subscriber session records. For example, a failure of a particular interface can cause multiple error messages to appear in different subscriber session records that represent the output of various wireless network transactions, thereby creating interleaved sequences of events in the respective subscriber session records. Examples of the technology disclosed herein lead to automation in leveraging all relevant information related to a subscriber activity for tasks such as automated problem troubleshooting of End-to-End (E2E) services and/or visualization of the information in the subscriber session records. Such automation inherently saves time and man hours and helps solve user problems that a particular target network element may be experiencing. Automated troubleshooting systems can benefit greatly from identification and representation of groups of related causes, as opposed to individual error messages, as this reduces noise (i.e., erroneous, meaningless, missing, incomplete, or difficult-to-interpret information), compresses the data and facilitates a more accurate representation of all transactions in the wireless network.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by web server 120 through a stand-alone or web-based client application. Web server 120 may include any server or computer system capable of delivering content to device 125.

Although only four devices 105, 110, 120, and 125 are shown in FIG. 1, it will be understood wireless network 115 may comprise any number of elements (i.e., nodes and endpoints). For example, in some implementations, wireless network 115 may include nodes or endpoints that may be components in a 3G or 4G wireless network, such as a Serving General Packet Radio Service (GPRS) Support Node (SGSN), Gateway GPRS Support Node (GGSN) or Border Gateway in a GPRS network, Packet Data Serving Node (PDSN) in a Code Division Multiple Access (CDMA) 2000 network, a Mobile Management Entity (MME), eNodeB, Serving Gateway (SGW), Home Subscriber Server (HSS) in a LTE network or any other core network nodes or routers that transfer data packets or messages between endpoints. Moreover, it will be understood that such nodes and endpoints may be interconnected in any suitable manner, including being coupled to one or more other such nodes and/or endpoints.

As noted above, many packets traverse wireless network 115 between endpoints. These packets may represent many different sessions and protocols. For example, if mobile device 105 is used for a voice or video call, then it may exchange Voice over Internet Protocol (VoIP) or Session Initiation Protocol (SIP) data packets with a SIP/VoIP server (not shown) using RTP. If mobile device 105 is used to send or retrieve email, it may exchange Internet Message Access Protocol (IMAP), Post Office Protocol 3 Protocol (POP3), or Simple Mail Transfer Protocol (SMTP) messages with an email server (not shown). If client device 105 is used to download or stream video, it may use Real Time Streaming Protocol (RTSP) to establish and control media sessions with web server 120. Alternatively, the user at mobile devices 105 and 110 or client device 125 may access a number of websites using HTTP protocol to exchange data packets with web server 120. It will be understood that packets exchanged between devices may conform to numerous other protocols now known or later developed.

In a typical situation, approximately one percent of the packets traversing wireless network 115 carry control data, such as information for setting-up, managing or tearing-down calls or sessions between endpoints. The other ninety-nine percent of the packets carry user data, such as actual voice, video, email or information content to and from connected devices.

In various embodiments, network monitoring system 100 may be used to monitor the performance of wireless network 115. To that end, monitoring system 100 may be configured to capture packets that are transported across wireless network 115. In some embodiments, packet capture devices may be non-intrusively coupled to network links to capture substantially all of the packets transmitted across the links. It will be understood that, in an actual network, there may be dozens or hundreds of physical, logical or virtual connections and links between nodes. In some cases, network monitoring system 100 may be coupled to all or a high percentage of these links. In other embodiments, monitoring system 100 may be coupled only to a portion of wireless network 115, such as only to links associated with a particular carrier or service provider. The packet capture devices may be part of network monitoring system 100, such as a line interface card, or may be separate components that are remotely coupled to network monitoring system 100 from different locations.

Monitoring system 100 may include one or more processors running one or more software applications that collect, correlate and/or analyze media and signaling data packets from wireless network 115. Monitoring system 100 may incorporate protocol analyzer, session analyzer, and/or traffic analyzer functionality that provides OSI (Open Systems Interconnection) Layer 2 to Layer 7 troubleshooting by characterizing network traffic by links, nodes, applications, service types and servers on wireless network 115. In some embodiments, these operations may be provided, for example, by the IRIS® toolset available from NetScout Inc., although other suitable tools may exist or be later developed.

The packet capture devices coupling network monitoring system 100 to wireless network 115 may be high-speed, high-density probes that are optimized to handle high bandwidth IP traffic, such as the GEOPROBE® G10, also available from NetScout, Inc., although other suitable tools may exist or be later developed. A service provider or network operator may access data from monitoring system 100 via a user interface station having a display or graphical user interface, such as the IRISVIEW configurable software framework that provides a single, integrated platform for several applications, including feeds to customer experience management systems and operation support system (OSS) and business support system (BSS) applications, which is also available from NetScout, Inc., although other suitable tools may exist or be later developed.

Monitoring system 100 may further comprise an internal or external memory for storing captured data packets, user session data, and configuration information. Monitoring system 100 may capture and correlate the packets associated with specific data sessions. In some embodiments, related packets may be correlated and combined into a record for a particular flow, session or call on wireless network 115. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

As the capability of wireless network 115 increases toward 10 Gigabits/second (Gbps) and beyond (e.g., 100 Gbps), however, it supports more services, users' flows and sessions. As such, it becomes difficult for a service provider or network operator to analyze all the traffic across entire wireless network 115, for example, to identify problem nodes or links. Some systems may collect all the data for a relatively short period of time, hoping that the sample taken is representative. However, as noted above, even such sample corresponding to a short period of time may include hundreds of PDUs. Other systems may collect a percentage of network traffic all the time and attempt to extrapolate the data for the entire network by simply scaling it. However, such selective collection of data may complicate trouble-shooting diagnosis process. To address these and other concerns, certain systems and methods described herein may enable the adaptive monitoring of telecommunications networks.

Figure 2:
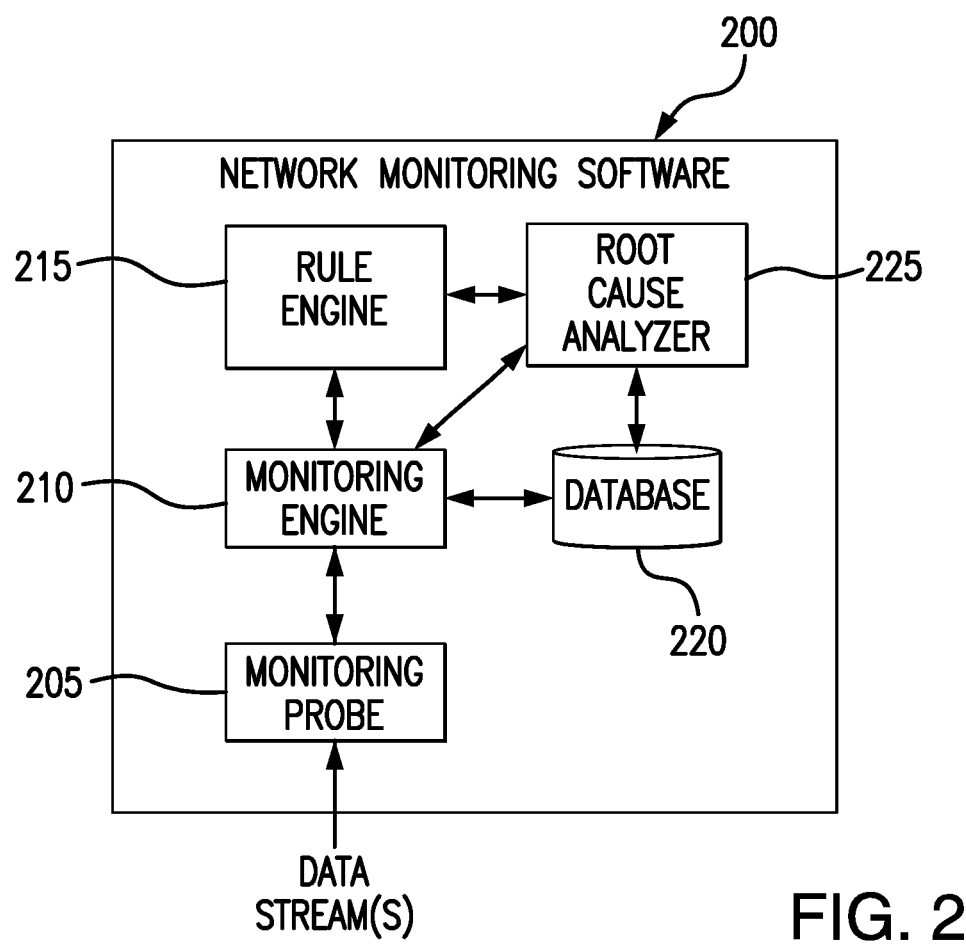
FIG. 2 is a block diagram of a network monitoring software program according to some embodiments of the present invention.

Turning now to FIG. 2, a block diagram of a network monitoring software program is depicted. In some embodiments, network monitoring software 200 may be a software application executable by monitoring system 100 of FIG. 1. As previously noted, a plurality of communication sessions or data streams may be transmitted across wireless network 115 between devices 105, 110, 120, and/or 125. Such communications may be streamed over HTTP, RTMP, RTP, or any other suitable protocols.

Monitoring probe 205 may be configured to capture data packets from wireless network 115, including, for example, data from one or more HTTP requests or sessions. As such, monitoring probe 205 may determine subscriber identifying information for the captured data packets and may combine related data into session or request records. Monitoring probe 205 may then feed session records and captured packet data to monitoring engine 210. In some cases, a session record may include multiple segments that are provided to monitoring engine 210 periodically while an associated session is active. Monitoring engine 210 may in turn be configured to extract session data from each session record and to identify the protocol for each session record.

Session data may include a plurality of PDUs corresponding to a plurality of different protocols stored to database 220. In other words, the plurality of PDUs comprises a plurality of signaling messages exchanged between one or more elements of wireless communication system 115. Database 220 may also store subscriber information and client device data.

Network monitoring software 200 may allow the service provider for wireless network 115 to collect data from various HTTP requests or sessions concurrently or simultaneously. Data for multiple requests or sessions is stored in database 220, which allows the service provider to track each service or to extract system-wide parameters. For example, monitoring probe 205 and/or monitoring engine 210 may identity the type of protocol being used for each session by analyzing the header of one or more data packets for that session.

Monitoring probe 205 and/or monitoring engine 210 may also track the bandwidth available to each service session, and may identify bandwidth changes that occur in real-time. Moreover, monitoring probe 205 and/or monitoring engine 210 may detect when gaps or missing fragments occur in the stream of data packets for any of the requests or sessions. The requests or service parameters, bandwidth information, and gap data may be collected to database 220 and/or presented to the service provider.

At least in some embodiments, session monitoring module 210 may use the collected information to generate QoE and KPIs for E2E service and for the overall network. The KPIs may be based, for example, on how often re-buffering, screen resolution changes, gaps, and/or missing fragments are detected. Excessive buffering during the session (i.e. re-buffering), numerous screen resolution changes, and gaps in the service stream may lower a user's QoE.

In an embodiment of the present invention, different sets of cause rules may apply to different types of traffic. Each rule may in turn dictate a portion of that traffic that will be used in subsequent processing such as, for example, the analysis of various individual transactions based on a specific rule and/or ruleset or the like. Additional examples of utilized transactional data may include, but are not limited to, connection establishment indicators, service performance indicators, authentication indicators, network congestion indicators, connection maintenance indicators, service completion indicators, service quality indicators, and/or service availability indicators.

Network monitoring system 100, under control of software 200, may also be configured to aggregate data to enable backhauling, to generate netflows and basic KPI calculations, time stamping of data, port stamping of data, filtering out unwanted data, protocol classification, and deep packet inspection (DPI) analysis. In addition, network monitoring system 100, may be further configured to perform analysis of data, extraction of key parameters for call correlation and generation of call data records (CDRs), application specific processing, service specific processing, etc.

According to an embodiment of the present invention, network monitoring software 200 also includes a rule engine 215. Rule engine 215 includes one or more software modules or components that manages and automates the aforementioned cause rules. For instance, rule engine 215 evaluates and fires one or more of the rules based on the evaluation of particular data. Generally, one advantage of a rule engine is the separation of the rules from the underlying application code. With the rules separated from the application code, rule engine 215 allows the users to modify the rules frequently without the help of technical staff and hence, allowing network monitoring software 200 to be more adaptable with the dynamic rules. The cause rules may be grouped or partitioned into one or more rule sets, where each rule set contains one or more rules. Then rule engine 215 executes the rules according to the execution order. In one embodiment, a model of the execution order is generated and loaded into rule engine 215.

Rule engine 215 may also be configured to exchange information with a root cause analyzer 225 as described below with respect to FIG. 3. The exemplary root cause analyzer 225 of FIG. 2 analyzes the data, parameters and/or information collected by the monitoring probes 205 (e.g., transactions, causes) based on an appropriate rule/ruleset to determine and/or identify the root cause(s) of network performance problems.

Figure 3:
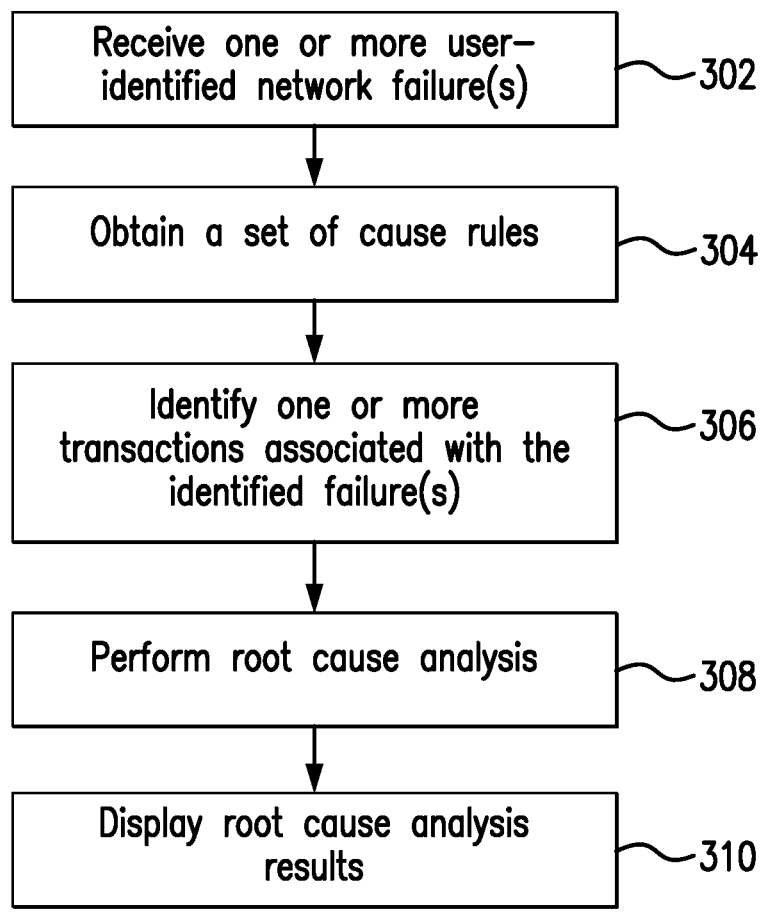
FIG. 3 is a flowchart of a method of automatically identifying failure in wireless networks using multi cause correlation, according to some embodiments of the present invention.

Referring now to FIG. 3, a flowchart of a method for of automatically identifying failures in wireless networks using multi cause correlation is provided, in accordance with embodiments of the present invention. Before turning to description of FIG. 3, it is noted that the flow diagram in FIG. 3 shows examples in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product. In some embodiments, the method described below may be performed, at least in part, by one or more components of network monitoring system 100.

According to an embodiment of the present invention, at step 302, monitoring engine 210 may provide on demand activation of the automated network failure root-cause analysis. In some embodiments, proactive service assurance can aid in lowering the impact and the prevention of failures or outages on communications network. In one embodiment, one or more network failures may be automatically detected based on data collected by monitoring probes 205. For example, monitoring probes 205 can collect network data indicating one or more network failures (e.g., alarms and/or traps) by monitoring one or more network elements or systems of wireless network 115. In an alternative embodiment, one or more network failures may be identified by a user while evaluating a plurality of subscriber session records stored in database 220 for long-term storage.

In certain embodiments, root cause analyzer 225 may be configured, at step 304, to dynamically obtain from rule engine 215 a rule set related to the one or more network failures identified by monitoring engine 210 in step 302. In one embodiment, root cause analyzer 225 may identify an appropriate rule set according to any number and/or combination of attributes such as physical interface (e.g. port, slot), network protocol, content source and destination identifiers (e.g., IP addresses), one or more wireless network nodes (e.g., Access Point Name (APN)), interface type (e.g. Ethernet), one or more QoS (Quality of Service) parameters, Layers 4 through 7 information (e.g. context-dependent, application-level, etc.), any arbitrary header content and/or payload content, session, environmental conditions, and any other type of deep-packet processing information. In some embodiments, each rule set matches one or more transactions with one or more cause codes for a given protocol in the wireless communication system 115.

At least in some embodiments of the present invention, rule engine 215 may include a natural language enhanced user interface. As discussed above, rule engine 215 broadly refers to a software module that manages cause rules. For instance, some embodiments of the rule engine 215 may store cause rules, evaluate cause rules, and execute cause rules based on results of rule evaluation. In some embodiments, one or more rule templates in a natural language are generated from one or more predefined sentences. The predefined sentences can be written in the natural language syntax as well using a plain grammar format. A natural language as used herein generally refers to a language written or spoken by humans for general-purpose communication, as opposed to constructs, such as computer-programming languages, machine-readable or machine-executable languages, or the languages used in the study of formal logic, such as mathematical logic. Some examples of a natural language include English, German, French, Russian, Japanese, Chinese, etc. In some embodiments, the predefined sentences are cause rules previously submitted by users. The predefined sentences may also include rules (e.g., cause rules) and/or sentences provided by administrators of the rule engine 215 and/or developers of the rule engine 215. Accordingly, in one embodiment, a user interface of rule engine 215 may be created using the rule templates to allow a user to compose rules for rule engine 215.

According to an embodiment of the present invention, in order to perform a root cause analysis, at step 306, root cause analyzer 225 is configured to identify one or more transactions associated with the failure(s) identified in step 302. In one embodiment, root cause analyzer 225 may be configured to obtain a timestamp that identifies a relative time when the identified failure(s) occurred. This timestamp may be used by root cause analyzer 225 to determine which data to read from database 220. The timestamp can also be used in comparisons to other transactions performed at the network 100 to determine if dependencies from other transactions are possible, if the transaction might be dependent on another transaction or if conflicting transactions have taken place.

Figure 4A:
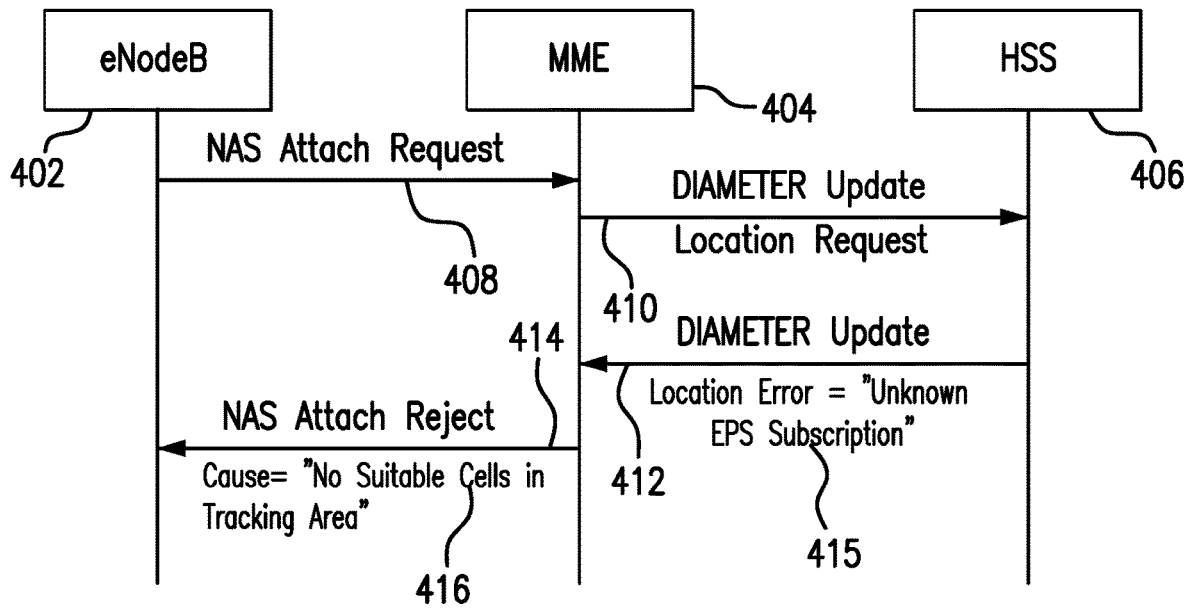
FIGS. 4A and 4B illustrate a method of performing a root cause analysis of network failures in a multiprotocol wireless communication system, according to an example.
Figure 4B:
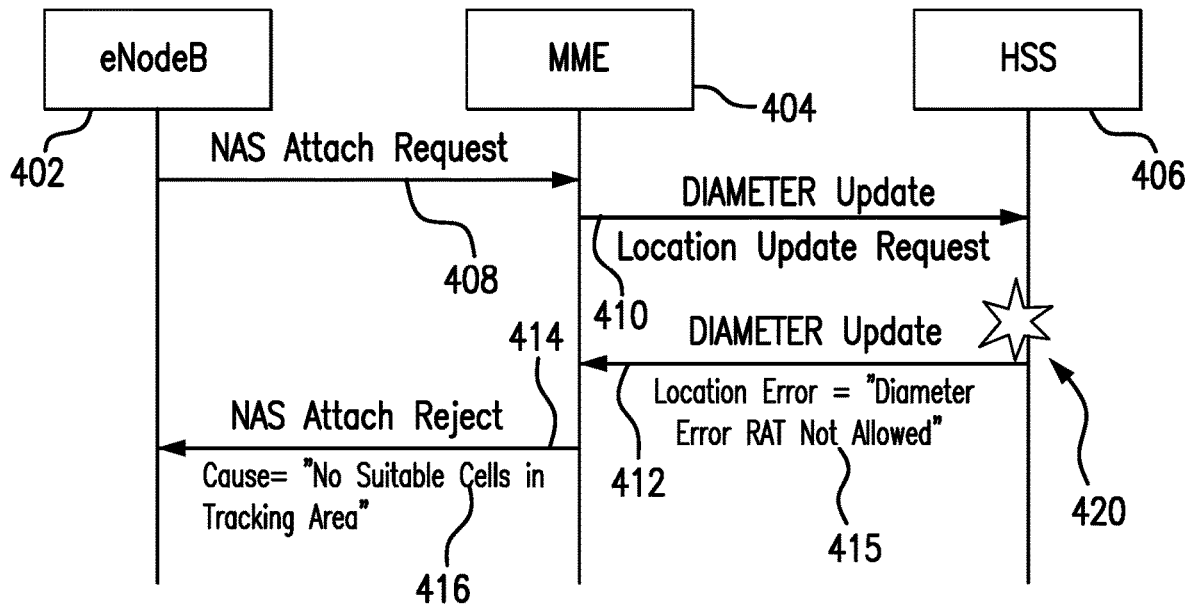

Next, at step 308, once a plurality of transactions relevant to a plurality of identified/detected network failures is identified, root cause analyzer 225 performs root cause analysis based on the data associated with the plurality of relevant transactions stored in database 220. FIGS. 4A and 4B illustrate a method of performing a root cause analysis of network failures in a multiprotocol wireless communication system, according to an example. Referring now to FIG. 4A, as noted above, in one embodiment the wireless network 115 conforms to the basic architecture of the LTE technology of 3GPP. Under this basic architecture, the wireless network 115 comprises at least one User Equipment (UE), at least one eNodeB 402, at least one MME 404 and at least one HSS 406. The basic architecture refers to standards that are formulated in accordance with the LTE series technologies, and the LTE series technologies comprise the LTE technology, the LTE-advanced technology and the predecessor technologies of the LTE technology. The predecessor technologies include, for example, a Universal Mobile Telecommunications System (UMTS) or a Global System for Mobile Communications (GSM), etc.

Furthermore, the aforesaid basic architecture may be divided into two parts, namely, an access network and an Evolved Packet Core (EPC). Specifically, the access network comprises the UE and the eNodeB 402, and the EPC comprises the MME 404 and the HSS 406 as well as at least one Serving Gateway (S-GW) and at least one Packet Data Network Gateway (P-GW). Because the UE, S-GW and the P-GW are not directly related to the illustrated embodiment, they are not depicted in the drawings. Furthermore, basic operations, the communication manner and the connections of the eNodeB 402, MME 404, HSS 406, the S-GW and the P-GW can all be known from the standards formulated in accordance with the LTE series technologies, so only contents directly related to embodiments of the present invention will be described hereinafter.

As shown in FIGS. 4A and 4B, the UE enters an attachment procedure with eNodeB 402, MME 404 and HSS 406. As part of the attachment procedure, eNodeB 402 transmits Non-Access Stratum (NAS) attach request 408 to MME 404. To enable proximity services (e.g., direct communication over the radio and/or via another path), the wireless network elements may discover each other. NAS messages, such as NAS attach request 408 may be used to communicate discovery between eNodeB 402 and MME 404. NAS attach request 408 may include various content, which may be used for discovery. MME 404 further sends a Diameter-Update Location Request 410 towards HSS 406. In response, under normal operation, HSS 406 typically sends a Diameter—Update Location Accept to MME 404. However, in certain cases, HSS 406 may respond with a Diameter-Update 412 having a specific error 415, such as "Unknown EPS subscription" (in the example illustrated in FIG. 4A) or "Diameter error RAT not allowed" (in the example illustrated in FIG. 4B). HSS 406 sends the former error code when UE's International Mobile Subscriber Identity (IMSI) is known to HSS 406, but the UE user has no EPS subscription. HSS 406 sends a later error code to indicate that the radio access technology (RAT) type used by the UE is not allowed for the IMSI. While specific implementations are discussed herein with respect to a Diameter protocol and specific transactions, it is understood that this is done for illustrative purposes only. A person skilled in the relevant art will recognizes that other protocols and transactions may be used without departing from the scope and spirit of the invention.

Further, as shown in FIGS. 4A and 4B, in both cases, MME 404 transmits a reject (connection release) message to the eNodeB 402, and reject message 414 can contain a cause value 416 indicating the rejected reason. The cause value 416 can be "No suitable cells in tracking area", for example. Notably, two different call scenarios (illustrated in FIGS. 4A and 4B) trigger different error codes 415 on the Diameter Interface. However, these error codes 415 map to the same cause value 416 included in the reject message 414. In existing networking monitoring tools the reason of the network failure can be determined by analyzing the cause value 416 contained in the reject message 414. However, since different network issues could potentially be associated with the same cause value 416, existing monitoring tools are limited in their diagnostic capabilities. In fact in order to identify a real cause of any failure users may be required to manually analyze and correlate the messages between different interfaces. This is very time consuming.

Advantageously, various embodiments of the present invention disclose root cause analyzer module 225 that utilizes one or more cause rules to identify network elements and/or transactions that caused the analyzed failure. At least in some embodiments, each rule in the at least one ruleset specifies a timestamp associated with occurrence of the one or more transactions matched with one or more cause codes for each protocol. Table 1 below illustrates exemplary rule set for different wireless protocols in accordance with aspects of the present invention:

TABLE 1

| Root Cause Description | Cause |
|---|---|
| HSS RAT Error | When protocol=[S1-MME]<br>Then search for transaction<br>Where transaction=Attach Reject with cause = * AND<br>Where protocol = [Diameter]<br>Where transaction = Update Location with cause = "Diameter Error RAT Not Allowed" having timerange [STARTTIME−5s, STARTIME+5s] |
| HSS No EPS subscription | When protocol=[S1-MME]<br>Then search for transaction<br>Where transaction=Attach Reject with cause = * AND<br>Where protocol = [Diameter]<br>Where transaction = Update Location with cause = "Unknown EPS subscription" having timerange [STARTTIME−5s, STARTIME+5s] |

Table 2 below illustrates another exemplary rule set for a scenario where a failure on the Authentication, Authorization and Accounting (AAA) server results in a cascading series of transaction failures across different interfaces (e.g., S1-MME, S11, S5 and S6b) in accordance with aspects of the present invention:

TABLE 2

| Root Cause Description | Cause |
|---|---|
| AAA Unknown User | When protocol=[GTP-V2]<br>Then search for transaction<br>Where transaction=Create Session with cause = "User Authentication Failed" AND<br>Where protocol = [Diameter]<br>Where transaction = Authentication and Accounting with cause = "Diameter Error User Unknown" having timerange [STARTTIME−5s, STARTIME+5s] |

Thus, according to an embodiment of the present invention, root cause analyzer 225 employs the cause rules to automatically identify failure causes by correlating transactions and corresponding cause codes (cause values) using, for example, timestamps, thusly substantially eliminating the need for any manual analysis. Next, at step 310, root cause analyzer 225 displays root cause analysis results to a user via a user interface. Such analysis results may include, for example, information related to the identified network element of the wireless communication system 115.

Advantageously, the disclosed embodiments of the present invention enable exclusively automatic troubleshooting of E2E services. Furthermore, the disclosed embodiments provide network monitoring systems an ability to quickly triage a plurality of identified/detected network problems, which is quite valuable to the end users of such monitoring systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
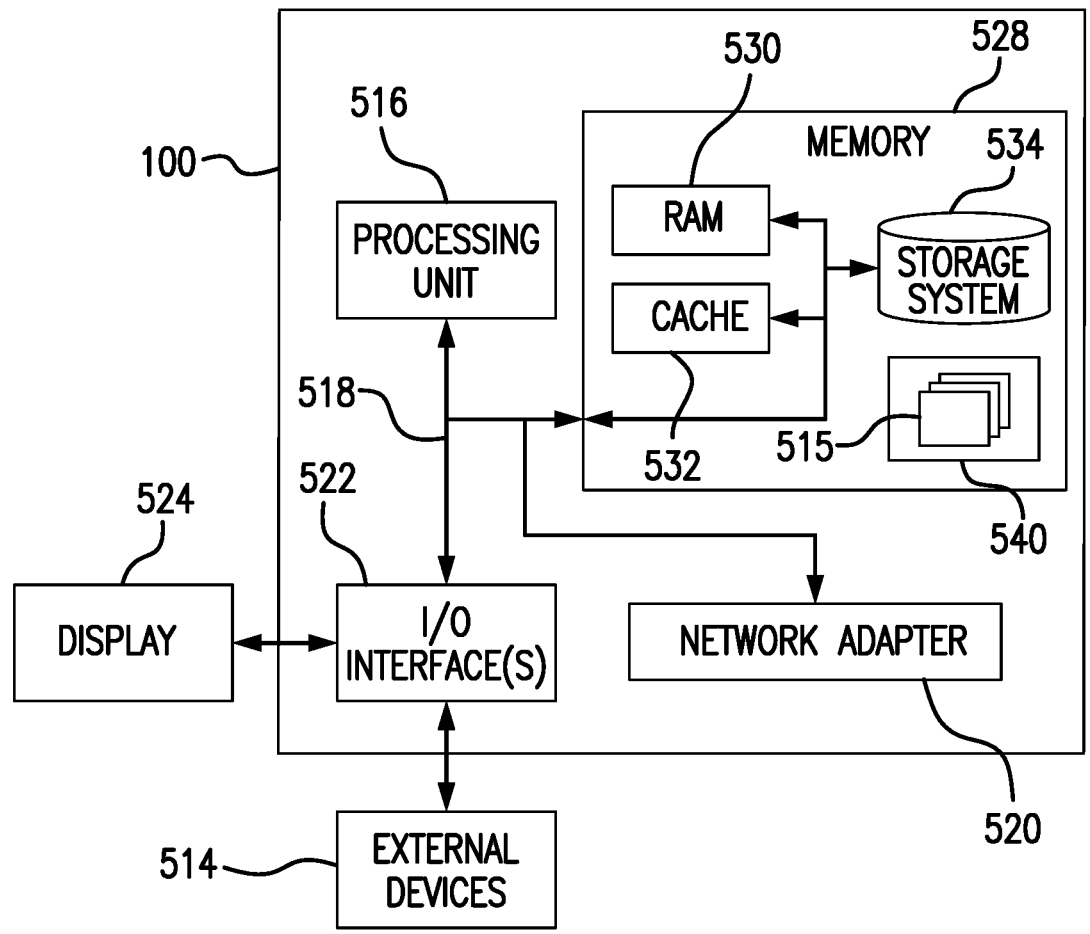
FIG. 5 is a block diagram of a computer system configured to implement various methods described herein according to some embodiments of the present invention.

Embodiments of the network monitoring system may be implemented or executed by one or more computer systems. One such computer system, the network monitoring system 100 is illustrated in FIG. 5. In various embodiments, network monitoring system 100 may be a server, a distributed computer system, a workstation, a network computer, a desktop computer, a laptop, or the like.

Network monitoring system 100 is only one example of a suitable system and is not intended to suggest any limitation as to the scope of use or functionality of embodiments of the invention described herein. Regardless, network monitoring system 100 is capable of being implemented and/or performing any of the functionality set forth hereinabove.

Network monitoring system 100 is operational with numerous other general purpose or special purpose computing system environments or configurations. Examples of well-known computing systems, environments, and/or configurations that may be suitable for use with the network monitoring system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of network monitoring system 100 may be described in the general context of computer system-executable instructions, such as program modules, being executed by a computer system. Generally, program modules may include routines, programs, objects, components, logic, data structures, and so on that perform particular tasks or implement particular abstract data types. Network monitoring system 100 may be practiced in distributed data processing environments where tasks are performed by processing devices that are linked through a communications network. In a distributed data processing environment, program modules may be located in both local and remote computer system storage media including memory storage devices.

The network monitoring system 100 is shown in FIG. 5 in the form of a general-purpose computing device. The components of network monitoring system 100 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network monitoring system 100 typically includes a variety of computer system readable media. Such media may be any available media that is accessible by network monitoring system 100, and it includes both volatile and non-volatile media, removable and non-removable media.

System memory 528 can include computer system readable media in the form of volatile memory, such as random access memory (RAM) 530 and/or cache memory 532. Network monitoring system 100 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515 (such as monitoring probe 205, monitoring engine 210, rule engine 215 and root cause analyzer 225) may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

Network monitoring system 100 may also communicate with one or more external devices such as a keyboard, a pointing device, a display, etc.; one or more devices that enable a user to interact with network monitoring system 100; and/or any devices (e.g., network card, modem, etc.) that enable network monitoring system 100 to communicate with one or more other computing devices. Such communication can occur via Input/Output (I/O) interfaces 522. Still yet, network monitoring system 100 can communicate with one or more networks such as a local area network (LAN), a general wide area network (WAN), and/or a public network (e.g., the Internet) via network adapter 520. As depicted, network adapter 520 communicates with the other components of network monitoring system 100 via bus 518. It should be understood that although not shown, other hardware and/or software components could be used in conjunction with network monitoring system 100. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring system, the system comprising:
a monitoring probe coupled to a wireless network configured to capture packet sessions from the wireless network;
a packet analyzer coupled to the monitoring probe for a analyzing packet session captured from the wireless network by the monitoring probe, the monitoring probe including:
a processor;
a memory coupled to the processor;
a database including session data of one or more transactions in a wireless communication system;
a rule engine configured and operable to store in the memory rules associated with a plurality of rule sets;
determine bandwidth available to packet service sessions and identify real-time bandwidth changes associated with the packet service sessions; and
an analysis engine configured and operable to identify, using the processor:
1) a rule set from the plurality of rule sets based upon a combination of at least two attributes of the packet service sessions selected from the following attributes: physical interface, network protocol, content source and destination identifiers, Access Point Name, interface type, and Quality of Service parameter; and
2) a root cause of a failure for one or more of the transactions based on at least one in the at least one identified rule set and the determined bandwidth available to packet service sessions and identified real-time bandwidth changes associated with the packet service sessions.

2. The system as recited in claim 1, wherein the stored session data comprises a plurality of protocol data units (PDUs) corresponding to a plurality of different protocols.

3. The system as recited in claim 2, wherein the plurality of PDUs comprises a plurality of signaling messages exchanged between network elements of the wireless communication system that are correlated into the one or more transactions and wherein the analysis engine is further configured and operable to correlate a plurality of cause codes associated with the one or more transactions.

4. The system as recited in claim 3, wherein the analysis engine is further configured and operable to identify a network element of the wireless communication system substantially responsible for the failure in the wireless communication system.

5. The system as recited in claim 4, wherein the analysis engine is further configured and operable to display information related to the identified network element of the wireless communication system.

6. The system as recited in claim 1, wherein the rule engine generates the at least one rule set using a natural language-like syntax and format.

7. The system as recited in claim 6, wherein the at least one rule set matches one or more transactions with one or more cause codes for a given protocol in the wireless communication system.

8. The system as recited in claim 7, wherein each rule in the at least one ruleset specifies a timestamp associated with occurrence of the one or more transactions matched with one or more cause codes for each protocol.

9. The system as recited in claim 8, wherein the analysis engine is further configured and operable to identify failure causes by correlating transactions and corresponding cause codes using timestamps.

10. The network monitoring system as recited in claim 1, wherein the analysis engine is configured and operable to detect gaps and missing fragments that occur in data packet streams.

* * * * *